United States Patent

Martin

[15] 3,636,266

[45] Jan. 18, 1972

[54] NEGATIVE IMPEDANCE LINE ISOLATORS

[72] Inventor: Stephen J. Martin, 1777 S.W. 17th Street, Miami, Fla. 33145

[22] Filed: Nov. 7, 1969

[21] Appl. No.: 874,833

[52] U.S. Cl. ........................................179/1 CN, 179/170 G

[51] Int. Cl. .......................................H04b 3/18, H04m 3/56

[58] Field of Search ................179/1, 170 G, 170 T, 170 NC, 179/1 CN; 333/80 T; 307/305, 284, 287, 324, 322, 352 R, 352 G, 352 K, 352 Q

[56] References Cited

UNITED STATES PATENTS

| | | | |
|---|---|---|---|
| 3,116,369 | 12/1963 | Cox | 179/1 CN |
| 3,135,829 | 6/1964 | Hultberg | 179/1 CN |
| 3,204,048 | 8/1965 | De Monte | 179/170 G |

OTHER PUBLICATIONS

Dimmer, Two New Negative-Impedance Voice Frequency Repeaters, The Automatic Electric Technical Journal, Vol. 4, No. 3, 12/55 pp. 108–118

Peard & Pierret, Serial and Shunt Negative Impedances, IBM Technical Disclosure Bulletin; Vol. 8, No. 2, 7/65 p. 312

*Primary Examiner*—William C. Cooper

*Assistant Examiner*—Jon Bradford Leaheey

*Attorney*—Anthony A. O'Brien

[57] ABSTRACT

Bidirectional, symmetrical negative impedance transmission line isolators having a high-impedance midpoint junction between a plurality of transistors for providing high-impedance isolation and enabling interconnection of any desired number of such circuits to form a telephone system conferencing network.

9 Claims, 3 Drawing Figures

PATENTED JAN 18 1972 3,636,266

INVENTOR
STEPHEN J. MARTIN
BY
Anthony A. O'Brien
ATTORNEY

NEGATIVE IMPEDANCE LINE ISOLATORS

BACKGROUND OF THE INVENTION

1. Field of the Invention

The present invention pertains to transmission line isolator circuits and more particularly, to a negative impedance line isolator employing few component parts and exhibiting high isolation characteristics.

2. Description of the Prior Art

In transmission lines, especially those used in telephone systems, isolation between successive points in the line has long been an important design consideration. This becomes extremely critical in systems simultaneously carrying audio signals over many long distance branches in order to prevent variations in the loading of the line at various points from being reflected back and causing a reduction in signal quality at other points in the system.

A number of approaches have been previously proposed to provide effective line isolation, most of which rely on amplification of the signals at spaced intervals along the line to compensate for signal attenuation and provide impedance isolation. Such circuits are generally referred to as repeater circuits and can be catagorized as being of either the hybrid type or the negative impedance type. In the former, signals coming from one direction are fed through a first unidirectional amplifier while signals coming from the opposite direction are amplified by a second unidirectional amplifier. By appropriate hybrid transformer techniques, the oppositely directed signals can simultaneously pass through the device without interacting. In addition, the hybrid isolates the east-west signal from the west-east signal to reduce the effects of impedance fluctuations through the repeater.

On the other hand, the negative impedance type repeater is typically inserted in series or in shunt with the transmission line and provides a varying degree of amplification as the transmission impedance fluctuates. Due to the negative impedance characteristics exhibited by such repeaters, as the output impedance decreases the amplification increases. Similarly, as the line impedance seen at the output of the device increases the amplification decreases. In this manner, variations in the AC loading of the transmission line which would normally increase or decrease the amplitude of signals on the line will be compensated for by the greater repeater amplification provided by a larger load and vice versa. Furthermore, by compensating for AC load fluctuations, the input signal to the repeater is isolated from the rest of the line.

While the above described repeaters have proven satisfactory under normal conditions of operation, they are generally complex and can only provide isolation by exhibiting amplification through a high impedance. Thus, in installations where system self-oscillation (due to feedback, for example) is a critical factor or where a high degree of isolation is needed with no amplification, conventional circuits are of limited value. Even though this problem has been recognized for a considerable period of time, a simple circuit for providing unity gain and high impedance isolation has heretofore been unavailable.

SUMMARY OF THE INVENTION

The present invention is summarized in that a transmission line impedance isolator includes first and second terminal ports, a first resistive network having a midpoint connected to a first point of reference potential, a second resistive network having a midpoint connected to a second point of reference potential, a first transistor having first, second and third electrodes, a second transistor having a first electrode directly connected to the first electrode of the first transistor, a second electrode coupled to the second electrode of the first transistor by the first resistive network, and a third electrode coupled to the third electrode of the first transistor by the second resistive network, and the first and second transistors being capacitively coupled to the first and second terminal ports, respectively, whereby AC impedance fluctuations at one of the first and second ports are isolated from the other of the ports.

It is an object of the present invention to construct a transmission line isolator which exhibits negative impedance characteristics.

The present invention has an additional object in the construction of a line isolator providing high isolation while being constructed of fewer component parts than the number of parts conventionally required.

It is a further object of the present invention to construct a bidirectional, symmetrical transmission line isolator having a high impedance midpoint junction enabling interconnection of a plurality of such circuits to provide a telephone conferencing network.

A further object of the present invention is the provision of a two-stage negative impedance telephone line isolator constructed to provide impedance isolation and unity gain.

The present invention is advantageous over conventional repeater circuits in the provision of efficient bidirectional telephone line isolation for two-wire telephone systems and low loss two-wire telephone line conferencing.

Further objects and advantages of the present invention will become apparent from the following description of the preferred embodiments when taken in conjunction with the accompanying drawing.

DESCRIPTION OF THE PREFERRED EMBODIMENTS

Figure 1:
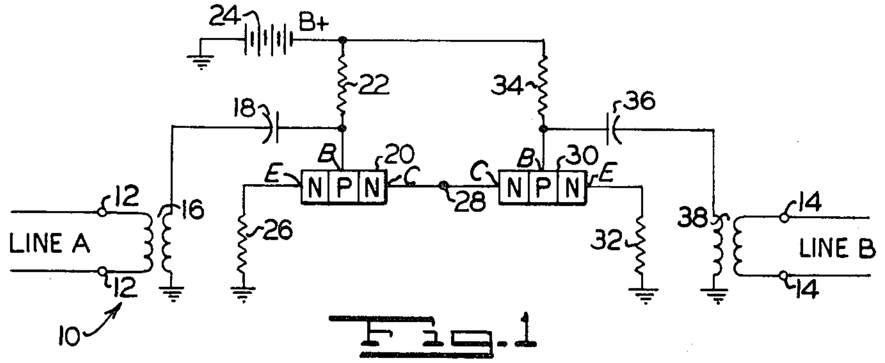
FIG. 1 is a schematic diagram of an embodiment of a negative impedance line isolator according to the present invention.

The present invention is embodied in a negative impedance transmission line isolator, indicated generally at 10 in FIG. 1, including terminal ports 12 and 14 adapted to be coupled to transmission lines A and B, respectively, in a communication network such as a telephone system. A matching transformer 16 has a low-impedance primary winding coupled across input terminals 12 and a high-impedance second winding connected between ground and an input coupling capacitor 18 which in turn is coupled to the base of an NPN-transistor 20. The base of transistor 20 is coupled through a resistor 22 to a source of positive potential 24, and the emitter of the transistor is coupled to ground by a resistor 26. The collector electrode of transistor 20 is coupled through a junction 28 to the collector of a second transistor 30 which has its base-emitter junction serially connected between one end of an emitter resistor 32 and one end of a base resistor 34. The other end of resistor 34 is connected to positive potential source 22 and the other end of resistor 32 is coupled to ground. A coupling capacitor 36 is connected at one end to the base of transistor 30 and at its other end to ground through a high impedance secondary winding of a second matching transformer 38. Transformer 38 has a low-impedance primary winding coupled to terminals 14 for interconnection with transmission line B of the system.

In operation, the circuit of FIG. 1 is maintained in a quiescent state prior to the receipt of an AC input signal on either one of lines A and B with both transistors 20 and 30 conductive. In the quiescent state, the current drawn by the device is controlled by resistors 22, 26, 32 and 34, while the input impedance, as seen by lines A and B, is primarily established by the value of resistors 22 and 34, respectively. Transformers 16 and 38 are impedance matching devices used to match the transmission lines to the isolator and prevent signal losses or distortion. In addition, capacitors 18 and 36 provide effective audio coupling from the respective sides of the isolator and isolate the circuit from DC transients. The circuit is designed to by symmetrical about junction 28; that is, the components used to the left of junction 28 are identical to those used to the right thereof. In one experiment, for example, the following component values where found to provide satisfactory operation:

B+=24 volts DC
Resistor 22=22,000 ohms
Resistor 26=10,000 ohms
Resistor 32=10,000 ohms
Resistor 23=22,000 ohms
Capacitor 18=1.0 microfarad
Capacitor 36=1.0 microfarad
Transistor 20=2N3242A
Transistor 30=2N3242A
Transformer 16=600 to 22,000 ohm impedance matching transformer
Transformer 38=600 to 22,000 ohm impedance matching transformer If a signal appears on line A, it will induce a corresponding signal in the secondary or high-impedance winding of transformer 16 which will be fed to the base of transistor 20 by capacitor 18. The AC voltage fluctuations produced by the incoming signal will cause the current drawn through the base-emitter junction of transistor 20 to vary in a directly proportional manner. Thus, the current flowing through resistor 26, the base-emitter path of transistor 20, and resistor 22 varies in accordance with the AC voltage excursions of the input signal.

As the current flowing from the base electrode of transistor 20 increases, the current flow through the emitter-to-collector path thereof decreases causing the current flow through the circuit path including resistor 26, the emitter-collector path of transistor 20, the collector-base path of transistor 30, and resistor 34 to decrease. Similarly, a decrease in the emitter-base current flow of transistor 20 produces an increase in the current flowing through the emitter-collector path thereof and a concurrent increase in the collector-base current through transistor 30. In other words, the instantaneous AC voltage levels of a signal on line A produce equal and opposite current fluctuations in transistors 20 and 30. In this manner, the input signal is identically reproduced at the opposite port of the isolator of the present invention with a 180° phase reversal. Of course, since the isolator is symmetrical a signal appearing on line B will have the same effect on the isolator and will produce a 180° out of phase signal at terminal port 12.

It should be noted at this point that due to the 180° phase relationship between the operation of transistors 20 and 30, signals simultaneously coming from the left-hand direction and the right-hand direction do not interact to any substantial degree to degrade the audio signals passing through the isolator. For this reason, normal intermodulation effects commonly experienced by two different signals which simultaneously pass through an active element, such as a transistor, are inherently minimized by the circuit of the present invention.

Referring now to the impedance isolation characteristics of the circuit of FIG. 1, assume that a sine-wave having a frequency somewhere between 30 and 100,000 cycles per second is applied to terminal port 12 and that transmission line B acts as an AC load. As the AC impedance at terminal port 14 varies due to changes in the transmission characteristics of line B, the amplitude of the AC signal appearing at terminal port 14 correspondingly varies. Such variation in the AC signal at port 14 is what would naturally be expected since the AC impedance load is directly acting upon this point in the circuit. In a similar manner, as the AC impedance of transmission line A varies with the sine-wave still applied to port 12, the amplitude of the AC signal appearing at both ports 12 and 14 will fluctuate accordingly.

On the other hand, since the AC signal applied to port 12 acts to inversely control the current flowing through the input and output sides of the isolator in a manner which merely commands the output signal to appear at terminal port 14 180° out of phase, any change in the AC impedance seen at terminal port 14 will have no effect on the amplitude of the AC input signal at port 12 and will only result in a modification of the ability of the instantaneous voltage level at port 14 to respond to AC input fluctuations. Thus, while AC signals pass unimpeded through the line isolator of the present invention, a high degree of input to output port AC impedance isolation is provided, the degree of isolation effectively increasing as the output impedance decreases. During one experiment, for example, using the circuit of FIG. 1 with the values of the various components as previously listed, an insertion loss of approximately 1.5 decibels was experienced, while over 45 decibels of input to output isolation were measured. In other words, when an AC input signal in the form of an audio sine-wave having a 5.0 volt peak-to-peak amplitude was applied to one port of the isolator and the other port loaded by an AC short circuit to ground, less than a 1.0 decibel amplitude level drop in the input signal was observed. In addition to the above described AC operation of the circuit, it should be noted that the lowering of the AC output impedance, even going to the limiting case of an absolute AC short circuit, will have no effect on the DC operating parameters established by the power source and the component parts.

To further clarify the operation of the circuit of the present invention brief mention will be made of a simple resistor analogue. Assume a fixed resistor having a value of resistance of 1,000,000 ohms is connected in series with a resistor having a value of resistance of 600 ohms when unloaded and close to zero when fully loaded. As the loading of the 600 ohm resistor varies, the total impedance of the series network varies between 1.0 megohm and 1.0006 megohms. Thus, the impedance fluctuations appearing at one port of an impedance transformation circuit which has an extremely low input to output impedance ratio will have an inconsequential effect on the impedance at the other port.

To relate this to the operation of the isolator of the present invention, it should be understood that the DC operating parameters of the circuit establish a very high AC collector impedance as compared with that of either the base or emitter impedance when measured to ground. In this manner, each transistor in the line isolator acts as a low ratio AC impedance transformation device. Therefore, AC load variations appearing at either one of the two terminal ports of the circuit produce inconsequential impedance fluctuations when reflected back through the common collector junction 28.

As described above, the isolator of the present invention functions in a manner which can best be described as having characteristics of a true negative impedance. In fact, preliminary testing has shown that the circuit will produce a typical S curve of increasing current with decreasing voltage similar to that obtained from some forms of tunnel diodes. The negative impedance characteristics produce an inversely proportional impedance-to-isolation relationship at the terminal ports which is directly responsible for the advantageous isolation properties of the present invention. For example, as the AC impedance seen by one port increases from a value below normal, the isolation to the opposite port proportionally decreases; similarly, as the AC impedance decreases due to loading, for example, the isolation increases. Thus, the isolation of the circuit is at a maximum when the load impedance is in its most adverse condition; i.e., when it is an AC short circuit.

Figure 2:
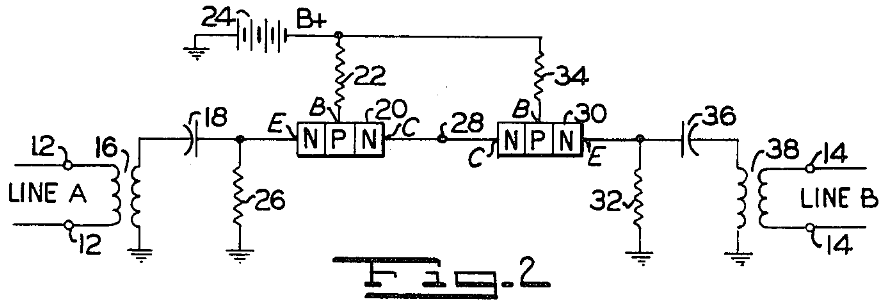
FIG. 2 is a schematic diagram of another embodiment of a negative impedance line isolator of the present invention.

Referring now to FIG. 2, a second embodiment of the negative impedance line isolator of the present invention is illustrated. The circuit of FIG. 2 is substantially identical to that of FIG. 1 with the exception of the terminal port connections to transistors 20 and 30. More specifically, each of the coupling capacitors 18 and 36 in FIG. 2 are connected between their respective matching transformers and the emitter electrodes of transistors 20 and 30, respectively. In this manner, signals appearing on the transmission lines are coupled to the emitter electrodes of the transistors rather than the base electrodes as in FIG. 1.

Since the circuit of FIG. 2 functions identically to that of FIG. 1, a discussion of its operation will not be repeated for the sake of brevity. It should be noted, however, that the same low insertion loss, high-impedance isolation characteristics are exhibited by the above described circuits regardless of whether input signals are applied to the emitter or base electrodes of the transistors.

Figure 3:
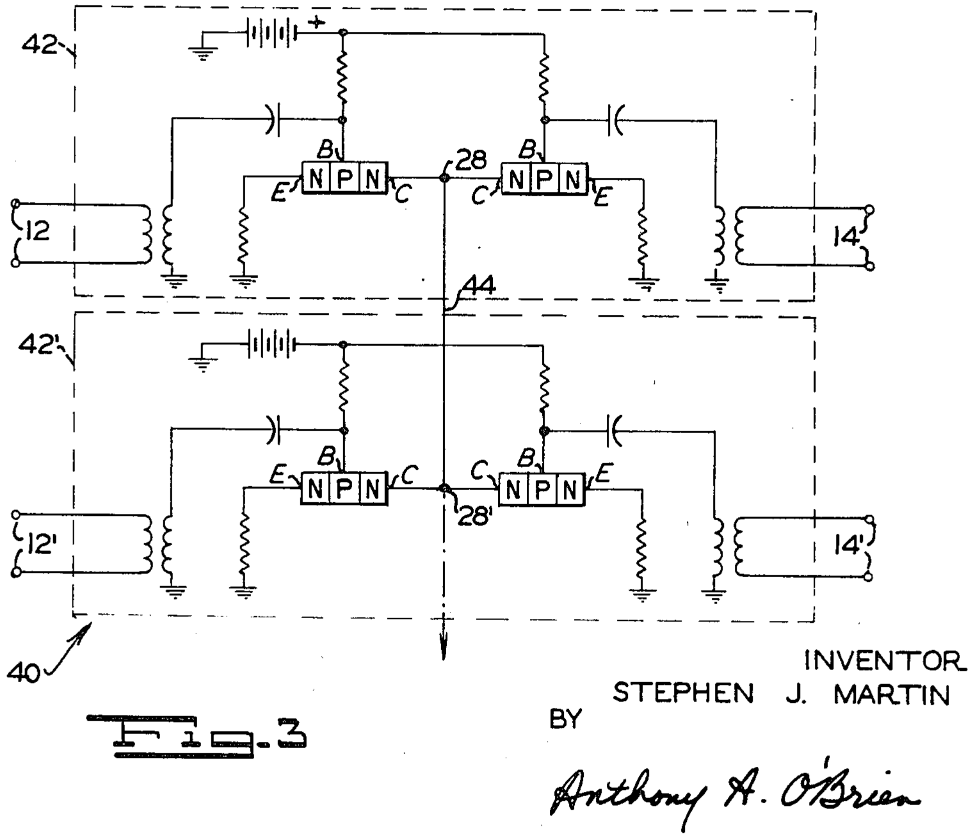
FIG. 3 is a schematic diagram of a four station conferencing network utilizing two of the negative impedance line isolators of FIG. 1.

A four station telephone system conferencing network, illustrated generally as 40 in FIG. 3, includes two negative impedance line isolators 42 and 42' each identical to the circuit of FIG. 1. Collector electrode junctions 28 and 28' of isolators 42 and 42', respectively, are coupled together by a conferencing bus 44 which, as illustrated, can be further extended to any number of desired isolator transistor stages depending upon the number of parties utilizing the network at any one time.

In operation a number of two-wire telephone lines are coupled to terminal ports 12, 14, 12' and 14' to provide, in the illustrated embodiment, a four party conferencing network. As described above with respect to the operation of the circuit of FIG. 1, the DC operating parameters of each of the isolators 42 and 42' establish an extremely high AC collector impedance as measured to ground. As a result, interconnection of a number of line isolators at the common collector junction point 28 has little effect on the operation of the individual circuits which function to provide high impedance isolation just as if no coupling there between had been made.

Since any AC signals appearing at any one of the terminal ports of the conferencing circuit of FIG. 3 will cause corresponding 180° phase shifted signals to appear on bus 44, such AC signals will be efficiently reproduced at the other ports of the network. In addition, since the two isolator circuits 42 and 42' are joined at a high AC impedance point, effective isolation between all ports of the network is provided in the same manner as is provided in the single isolator circuits described above.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. A transmission line impedance isolator comprising first and second terminal port means,
   - a first symmetrical resistive network having a resistive midpoint connected to a first point of reference potential,
   - a second symmetrical resistive network having a resistive midpoint connected to a second point of reference potential,
   - a first transistor having first, second and third electrodes,
   - a second transistor having first, second and third electrodes corresponding to said first, second and third electrodes, respectively, of said first transistor,
   - said second transistor having said first electrode thereof directly connected to said first electrode of said first transistor, said second electrode thereof coupled to said second electrode of said first transistor by said first resistive network, and said third electrode thereof coupled to said third electrode of said first transistor by said second resistive network, and
   - corresponding ones of said second or third electrodes of said first and second transistors being capacitively coupled to said first and second terminal ports, respectively, whereby AC impedance fluctuations at one of said first and second ports are isolated from the other one of said ports.

2. The invention as recited in claim 1 wherein said first resistive network comprises first and second identical resistors each having one end coupled to said first point of reference potential and the other end coupled to a respective one of said second electrodes of said first and second transistors.

3. The invention as recited in claim 2 wherein said second resistive network comprises third and fourth identical resistors each having one end coupled to said second point of reference potential and the other end coupled to a respective one of said third electrodes of said first and second transistors.

4. The invention as recited in claim 3 wherein said first, second and third electrodes of said first and second transistors comprise collector, base and emitter electrodes, respectively.

5. The invention as recited in claim 4 wherein each of said first and second terminal port means comprises an impedance matching transformer and a coupling capacitor serially connected between said transformer and a respective one of said first and second transistors.

6. A telephone system conferencing network for a plurality of telephone subscriber lines comprising
   - a plurality of terminal port means each adapted to be coupled to one of the plurality of telephone subscriber lines,
   - a first symmetrical resistive network having a resistive midpoint connected to a first point of reference potential,
   - a second symmetrical resistive network having a resistive midpoint connected to a second point of reference potential,
   - a like plurality of transistors each having corresponding first, second and third electrodes, said first electrodes being directly connected to each other, said second electrodes being coupled to each other by said first resistive network, and said third electrodes being coupled to each other by said second resistive network, and
   - corresponding ones of said second or third electrodes of said plurality of transistors being capacitively coupled to said plurality of terminal ports, respectively, whereby AC impedance fluctuations on one of said plurality of telephone subscriber lines are isolated from the others of said plurality of telephone subscriber lines.

7. The invention as recited in claim 6 wherein said first resistive network comprises a like plurality of identical resistors each having one end coupled to said first point of reference potential and the other end coupled to a respective one of said second electrodes of said plurality of transistors.

8. The invention as recited in claim 7 wherein said second resistive network comprises a like plurality of identical resistors each having one end coupled to said second point of reference potential and the other end coupled to a respective one of said third electrodes of said plurality of transistors.

9. The invention as recited in claim 6 wherein said first, second and third electrodes of said plurality of transistors comprise collector, base and emitter electrodes, respectively.

* * * * *